United States Patent

Ben Daniel et al.

[15] 3,647,223

[45] Mar. 7, 1972

[54] SELECTIVE AUDIO PLAYBACK APPARATUS

[72] Inventors: David J. Ben Daniel, Schenectady, N.Y.; John R. Morgan, Phoenix, Ariz.; John O. Fielding, Ballston Lake, N.Y.

[73] Assignee: General Electric Company

[22] Filed: May 26, 1969

[21] Appl. No.: 827,794

[52] U.S. Cl. ....................274/9 R, 179/100.4 D, 340/173 R, 340/174.1 C

[51] Int. Cl. ........................................................G11b 17/06

[58] Field of Search .................................274/1, 42–44, 4.1, 274/4.2, 9, 13–15, 17, 20–22; 35/8 A, 9, 35 C; 340/174.1 C

[56] References Cited

UNITED STATES PATENTS

| | | | |
|---|---|---|---|
| 1,340,358 | 5/1920 | Ahearn | 274/15 |
| 1,429,755 | 9/1922 | Mitchell | 274/15 |
| 1,921,742 | 8/1933 | Franklin | 274/9 UX |
| 2,031,074 | 2/1936 | Scheibel | 274/15 UX |
| 2,953,384 | 9/1960 | Walters | 274/17 |
| 3,138,790 | 6/1964 | Trimble | 340/174.1 C |
| 3,337,852 | 8/1967 | Lee | 340/174.1 C |
| 3,511,509 | 5/1970 | Firestone | 274/9 |
| 3,212,074 | 10/1965 | Daniels | 340/174.1 |

OTHER PUBLICATIONS

Hagopian, J. J., IBM Technical Disclosure Bulletin, Vol. 9 No. 11, April 1967

Hildebrand, J. O., IBM Technical Disclosure, Vol. 3 No. 11, April 1961

*Primary Examiner*—Leonard Forman
*Assistant Examiner*—Dennis A. Dearing
*Attorney*—Paul A. Frank, Richard R. Brainard, Charles T. Watts, Frank L. Neuhauser, Oscar B. Waddell and Joseph B. Forman

[57] ABSTRACT

Audio playback apparatus is described including phonograph means having a permanent magnet mounted in the pickup arm and a solenoid affixed at one side of the turntable for attracting or repelling the permanent magnet on the arm. The phonograph disk itself comprises information recorded in nested spiral-shaped grooves, each spiral-shaped groove intersecting an annular master groove containing spiral groove identification data. The stylus travels in the master groove to detect spiral groove identification data. When the recorded identification data matches the selected data, the solenoid repels the magnet, moving the pickup arm inward toward the center of the disk and into the selected spiral groove to reproduce the information recorded in the selected spiral groove.

5 Claims, 6 Drawing Figures

INVENTORS:
DAVID J. BEN DANIEL,
JOHN R. MORGAN,
JOHN O. FIELDING, by Richard R. Brainard
THEIR ATTORNEY INVENTORS:
DAVID J. BEN DANIEL,
JOHN R. MORGAN,
JOHN O. FIELDING,
by Richard R. Brainard
THEIR ATTORNEY INVENTORS:
DAVID J. BEN DANIEL,
JOHN R. MORGAN,
JOHN O. FIELDING,
by Richard R. Brainard
THEIR ATTORNEY INVENTORS:
DAVID J. BEN DANIEL,
JOHN R. MORGAN,
JOHN O. FIELDING,
by Richard R. Brainard
THEIR ATTORNEY

INVENTORS:
DAVID J. BEN DANIEL,
JOHN R. MORGAN,
JOHN O. FIELDING, by Richard R. Brainard
THEIR ATTORNEY

SELECTIVE AUDIO PLAYBACK APPARATUS

INTRODUCTION

This invention relates to audio playback apparatus including a novel recording member, and more particularly to a system which provides random access to recorded data in accordance with a predetermined data selection signal.

Random access to audio information recorded on magnetic tape is difficult to obtain at high speed, unless only a small amount of data is recorded. This is because the tape must be rewound at high speed to reach any predetermined data location on the tape. On lengthy tapes, this process is so time consuming as to make it prohibitive for rapid random access use.

Another type of large-capacity audio recording system comprises phonograph disks. However, conventional phonograph disks do not readily lend themselves to random access operation, due to lack of means for accurately positioning the pickup arm at the desired location on the disk. Therefore, while need has long existed for large-capacity random access audio storage systems, systems of this type having satisfactory speed of data retrieval and capacity for data storage have heretofore been essentially nonexistent.

The present invention concerns apparatus for providing random access to audio information recorded on a phonograph record. To obtain a readout of audio information, the user places a record disk containing the total information on a phonograph turntable, and the turntable is maintained in continuous rotation. Information recorded on the disk is contained in a plurality of grooves recorded in the shape of nested spirals. An annular groove, close to the perimeter of the disk, intersecting each of the spirals at their outermost portions is provided. The annular groove may be considered a master or ready groove in which the stylus initially tracks and is then urged into a selected one of the nested spiral grooves. In a preferred embodiment, spiral groove identification information is recorded in the master groove.

The apparatus may also be designed so that several users may utilize the same audio reproducing apparatus and the same audio storage means at the same time, without interfering with each other's use of the equipment.

The phonograph has a pickup arm or arms situated at one or more locations about the turntable. Each pickup arm is of the conventional type except that a small permanent magnet is mounted on each arm. In addition, a solenoid associated with each pickup arm, respectively, is situated around the turntable to influence the permanent magnet by either attracting or repelling the magnet, depending upon the polarity of DC current in the solenoid. Each pickup arm provides signals to a transducer, such as a set of earphones or a loudspeaker, used by a single user who has control of the polarity of the magnetic field produced by the solenoid associated with his pickup arm.

The user has at his station means for accessing the recorded information. These means may comprise an array of pushbuttons, or, in the alternative, may comprise tone responsive means acoustically coupled to a telephone at the receiving end of a line to the selective tone generating telephone, such as the Touch-Tone telephone available from American Telephone and Telegraph Company. The selection means closes circuits so as to formulate selection data to select for playback a predetermined one or more of the nested spiral grooves. The stylus of the pickup arm connected to the user-'s audio transducer is dropped into the annular groove at the time of the selection signal and, when groove identification data picked up from the annular groove matches the formulated selection data, the solenoid current reverses and produces a magnetic field intending to drive the pickup arm inwardly. Accordingly, since the record is continuously rotating, the stylus moves into the next spiral groove which it encounters, and the information recorded in that groove is played back to the user either through an individual audio transducer, such as a set of headphones, or at his selective tone generating telephone station. Upon completion of playback, the pickup arm is retracked and put into standby position.

Accordingly, one object of the invention is to provide a system for reproducing a segment of audio information contained within audio information storage apparatus.

Another object is to provide a system for permitting random access to data in the form of recorded audio information in accordance with operation of selection means.

Another object is to provide audio data storage means capable of providing rapid retrieval of any desired portion of audio information recorded thereon.

Another object is to provide a phonograph record having information recorded in grooves having the shape of nested spirals, with spiral groove identification information recorded in an annular groove near the perimeter of the disk.

Another object is to provide a phonograph pickup arm capable of being moved by a magnetic field in a generally radial direction with respect to the turntable carrying a phonograph disk thereon.

Briefly, in accordance with a preferred embodiment of the invention, audio playback apparatus comprises phonograph means having at least one pickup arm with a permanent magnet mounted thereon, and a solenoid for attracting or repelling the permanent magnet of the arm. Apparatus for storing a plurality of audio messages is also included, and comprises a record carrying plurality of independent, information-bearing grooves thereon which are formed in the shape of nested spirals, together with an additional groove in the shape of an annulus containing spiral groove identification data recorded thereon and situated close to the perimeter of the record. The additional groove intersects each of the spiral-shaped grooves at or near their outermost origins.

Audio reproducing apparatus suited for random access playback of information from a record, particularly a record having nested spiral grooves and including a tone arm electromagnetically controlled by a control circuit that may include both information selecting and position-responsive switching means is disclosed and broadly claimed in BenDaniel et al., application, Ser. No. 827,792, filed concurrently herewith and assigned to the assignee of this application.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
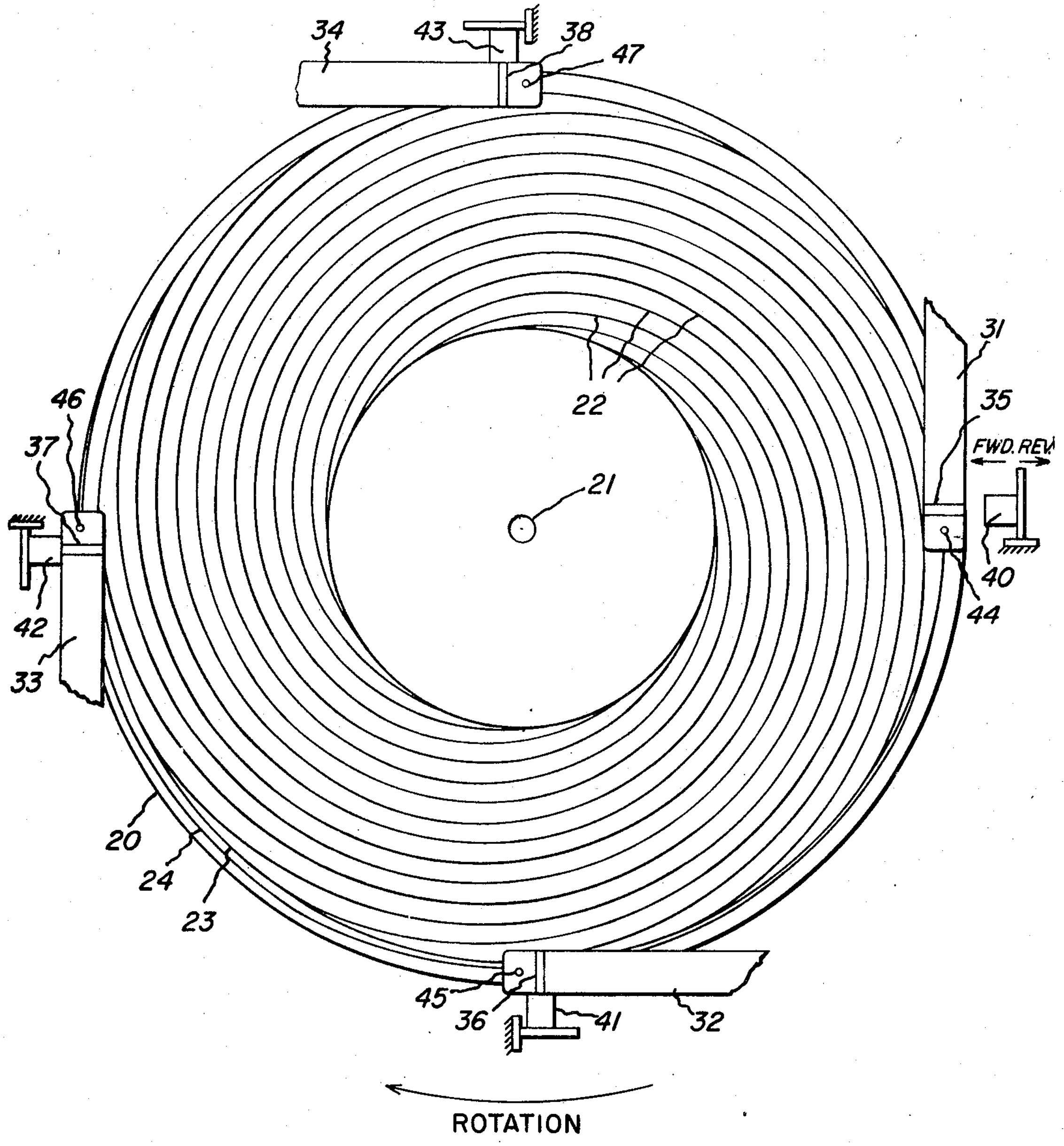
FIG. 1 is an illustration of a phonograph disk containing recorded audio information, and a plurality of pickup arms positioned to retrieve data therefrom.

FIG. 1 is an illustration of a phonograph disk 20 which provides storage of audio information capable of being randomly accessed, and a plurality of phonograph pickup arms 31, 32, 33 and 34 situated at different locations around the disk. Disk 20 is mounted on a conventional turntable (not shown) and centered about a spindle 21 passed through a hole at the center of the disk. Information is recorded on disk 20 in the form of conventional grooves 22 arranged in the shape of nested spirals. Although only 12 information grooves are shown on disk 20 for clarity of description, a 12-inch-diameter disk will accommodate as many as 400 one-revolution spiral grooves. At a typical operating rate of 16⅔ revolutions per minute, a total of 24 minutes of information can be recorded on one side of a 12-inch monaural disk. Of course, the groove lengths may be altered as desired, so that a 12-inch record may include, for example, 100 grooves in the form of nested spirals, each groove being four revolutions in length. Stereo recording may be employed, allowing twice the information storage, the two sides having different stored messages.

Each of grooves 22 originates at an annular master groove 23 near the perimeter of the record. Typically, groove 23 is circumferential in configuration. If desired, a lead-in groove 24 containing no information may be recorded on the disk between the perimeter and annular groove 23. The purpose of lead-in groove 24 is to permit the stylus of the pickup arm to be lowered to the surface of the record outside the master groove 23 and thereby avoid undue wear on groove 23.

Each of pickup arms 31, 32, 33 and 34 is a conventional arm of the type employed in conventional phonographs, with the exception that a small permanent magnet 35, 36, 37 and 38, is mounted atop each arm respectively. DC-operated solenoids 40, 41, 42 and 43 are mounted on the base (not shown) of the phonograph, respectively, in positions to be adjacent to each of respective pickup arms 31, 32, 33 and 34 when the respective pickup arm is in a rest or standby position. When in the standby position, the pickup arm is held by the solenoid and positioned so that its stylus is above the region of disk 20 between master groove 23 and the perimeter of the disk. When current flow in the solenoid, such as solenoid 40, is in one direction, pickup arm 31 is attracted to the solenoid due to the magnetic field of solenoid 40 acting in the reverse direction, as indicated by the arrow. On the other hand, when this current is reversed, the magnetic field produced by solenoid 40 also reverses and pickup arm 31 is pushed in a generally radial direction toward the center of the disk because of the mutual repulsion between the field of the solenoid and the field of permanent magnet 35. When solenoid 40 is deenergized, pickup arm 31 merely drops, lowering the stylus onto the portion of the disk beneath the stylus. The position of the stylus on the underside of each of pickup arms 31, 32, 33 and 34 is indicated by the region designated 44, 45, 46 and 47, respectively.

Information recorded in each of nested spiral-shaped grooves 22 comprises audio information intended to be accessed by the user of the apparatus. Each spiral-shaped groove is thus correlated with one or more accessing devices, such as pushbuttons or decimal-to-binary encoders operated in response to tones generated by a selective tone generating telephone, for example. The disk may be programmed so that a plurality of different actuations of the information selection apparatus may be employed to select the same spiral-shaped groove on disk 20. The programming information is recorded in master groove 23 as part of the spiral groove identification information.

In one embodiment, the spiral groove identification information is recorded in the form of audio tones representing binary numbers. Thus, one or more audio tones occurring simultaneously or in sequence provide information identifying the next spiral groove branching off from the master groove. By employing selection circuitry of the type illustrated in FIG. 2 and FIG. 2A or 2B, described infra, the permanent magnet on the pickup arm is repelled generally radially toward the center of the disk when the identification information for the spiral groove selected by the user has been encountered by the stylus in the master groove. The stylus thus enters the selected spiral groove.

In another embodiment, the spiral groove identification information may be recorded in the form of pulses which are counted as the phonograph disk is rotated. These pulses are counted by the apparatus illustrated in FIGS. 2 and 3, described infra. When the number corresponding to the spiral groove selected by the user has been reached, the pickup arm having its stylus travelling in the master groove is pushed inward by the mutual repulsion of the magnetic fields produced by the solenoid and the permanent magnet on top of the pickup arm. The stylus thus enters the next spiral groove encountered, and the information recorded in the groove is played back to the user of the apparatus.

Upon completion of playback of a single spiral groove, the pickup arm is mechanically returned to its rest or standby position. Prior to this time, however, the magnetic field emanating from the solenoid has been reversed in polarity. The solenoid thus attracts the permanent magnet of the pickup arm and holds the arm in its standby or rest position until the next spiral groove accessing device has been operated by the user.

The system has capability of recording branching information. Thus, if desired, branching logic may also be recorded in the master groove of disk 20. Hence, if the same access selection has been made twice in succession, the second selection may establish logic to select another spiral groove wherein further information is recorded. Making the same selection for a third time in succession may yet access another spiral groove to present still further information to the user.

Figure 1A:
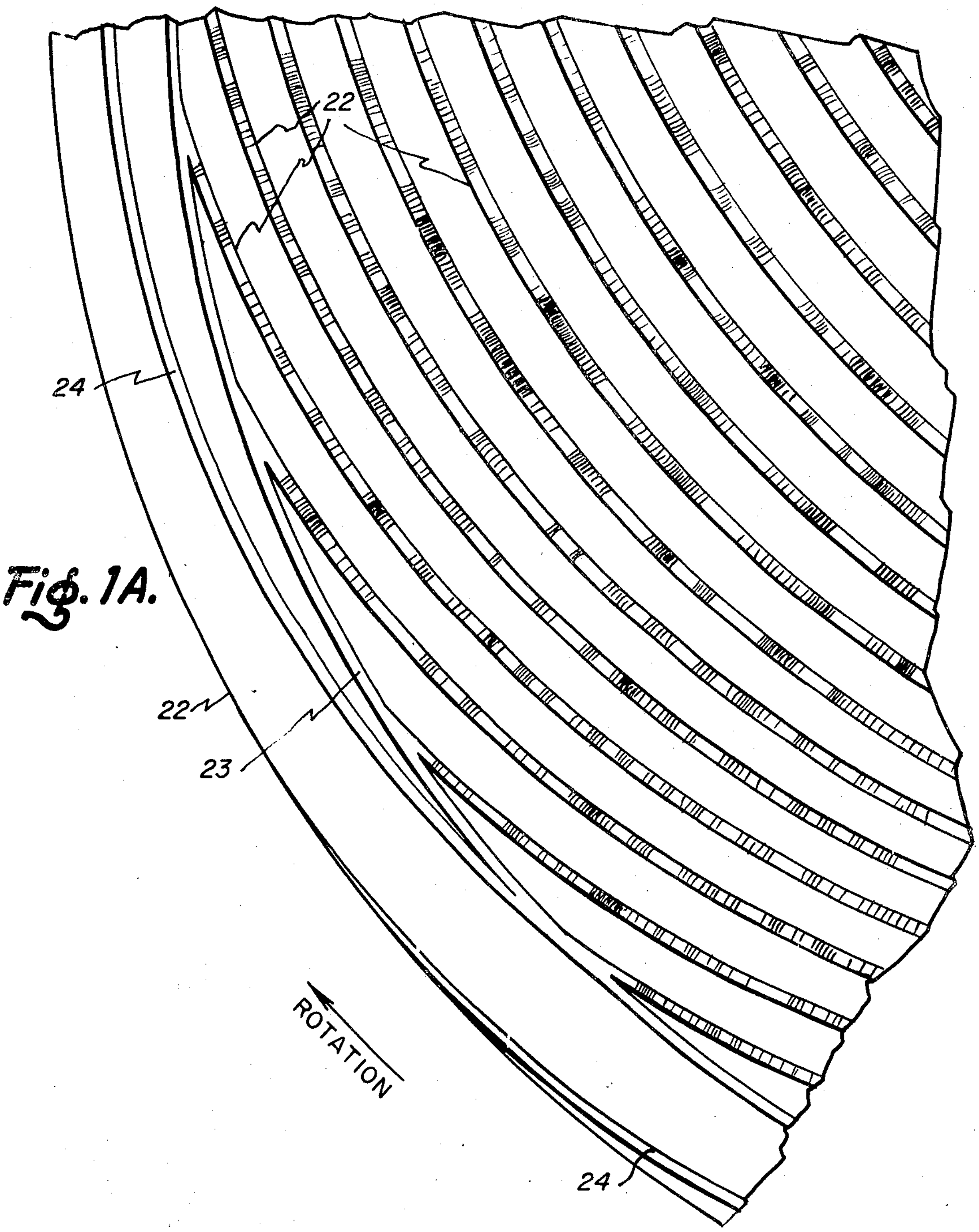
FIG. 1A is an enlarged illustration of a portion of the phonograph disk illustrated in FIG. 1.

FIG. 1A illustrates a greatly enlarged portion of disk 20, showing clearly how each of grooves 22 branches off from master groove 23. In addition, the position of lead-in groove 24 in relation to master groove 23 is also illustrated. Rotation of the disk in both FIGS. 1 and 1A is in the direction indicated by the arrow.

Figure 2:
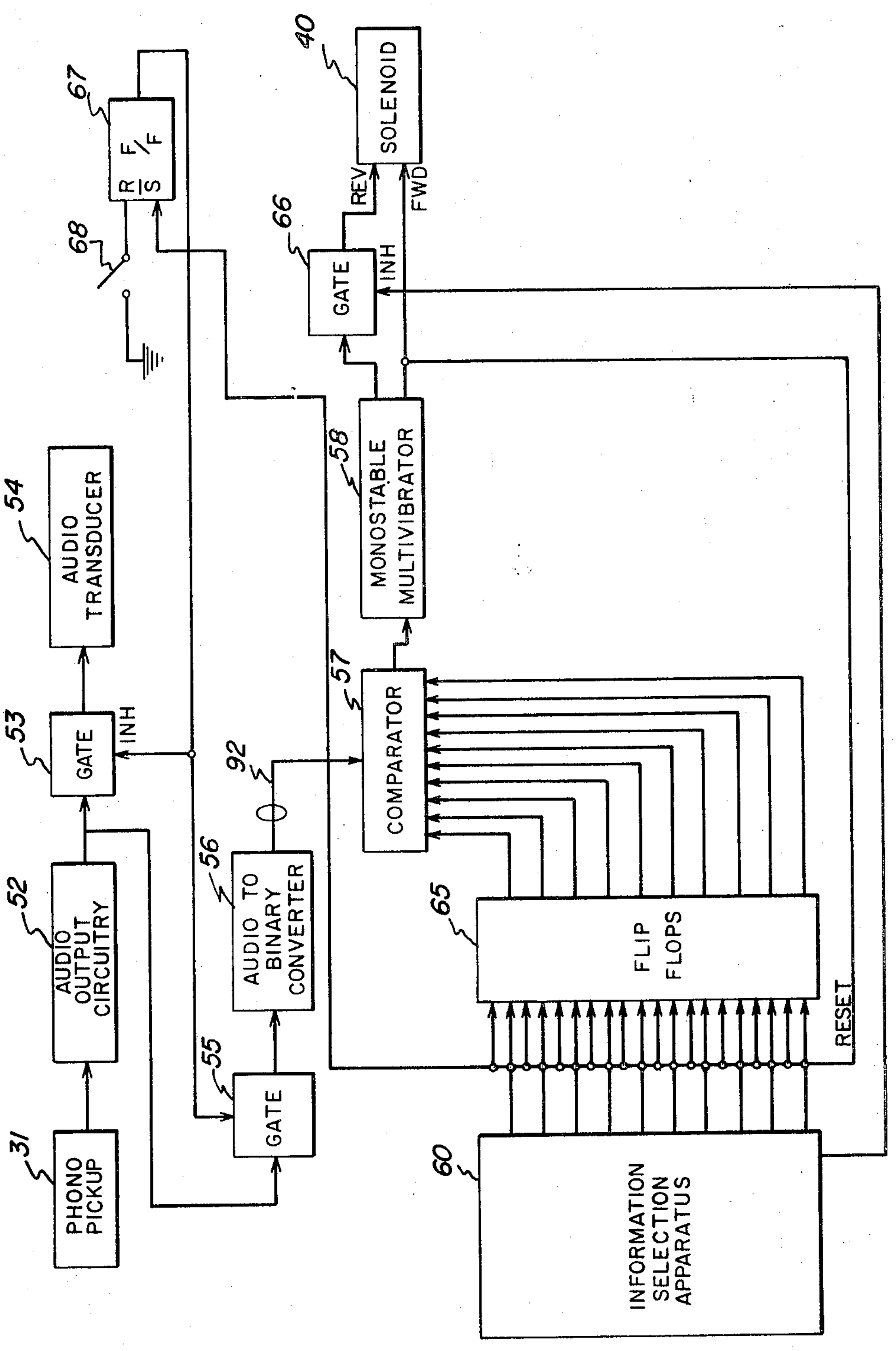
FIG. 2 is a block diagram of circuitry employed to actuate any one pickup arm on the phonograph of the invention.

FIG. 2 is a block diagram of electronic circuitry employed in one embodiment of the invention for a single user using pickup arm 31. It should be understood that a plurality of users may utilize the information recorded on a single disk by virtue of the plurality of pickup arms situated on the phonograph on which the disk is rotating, since operation of any pickup arm is independent of the operation of the other pickup arms. However, for simplicity, the electronic apparatus described is that which is utilized by a single user. Thus, in FIG. 2, the output of phono pickup 31 is coupled through audio output circuitry 52, which comprises conventional amplifier circuitry employed in the phonograph, to the input of an INHIBIT-gate 53. The output of INHIBIT-gate 53 is coupled to an audio transducer 54, preferably comprising a set of head phones. The output of audio output circuitry 52 is also coupled to the input of a gate 55 which is switched into its conductive condition at the same time gate 53 is switched into its blocked or nonconductive condition. Both gates 53 and 55 are actuated by the reset or R condition of a flip-flop circuit 67 which is reset upon closure of the phonograph reset switch 68. Reset switch 68 comprises the switch which is closed when the pickup arm reaches its centermost position on the record disk in order to return the pickup arm to its starting or standby position.

Figure 2A:
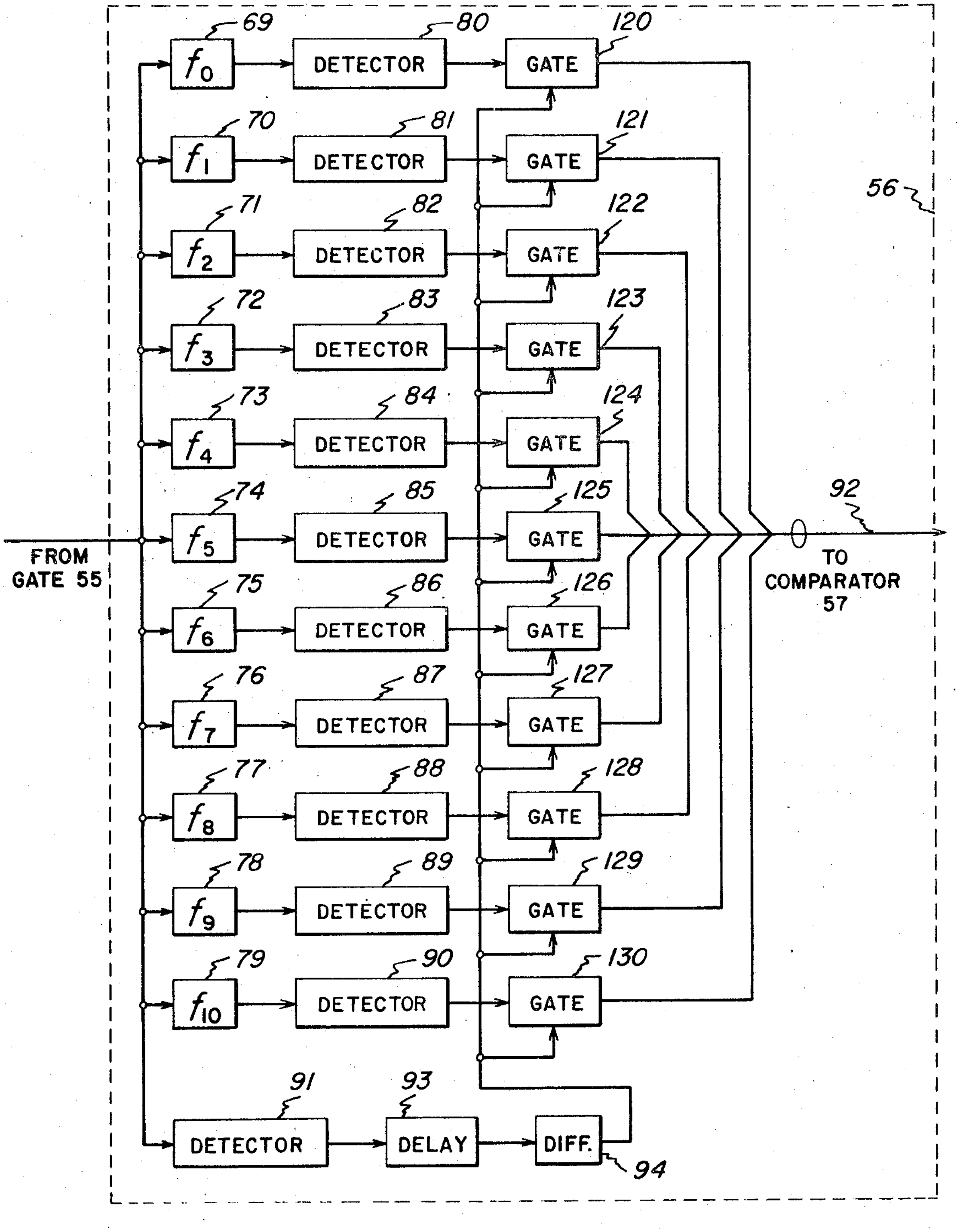
FIGS. 2A and 2B are block diagrams of circuitry which may be employed as the audio-to-binary converter of the apparatus shown in FIG. 2.
Figure 2B:
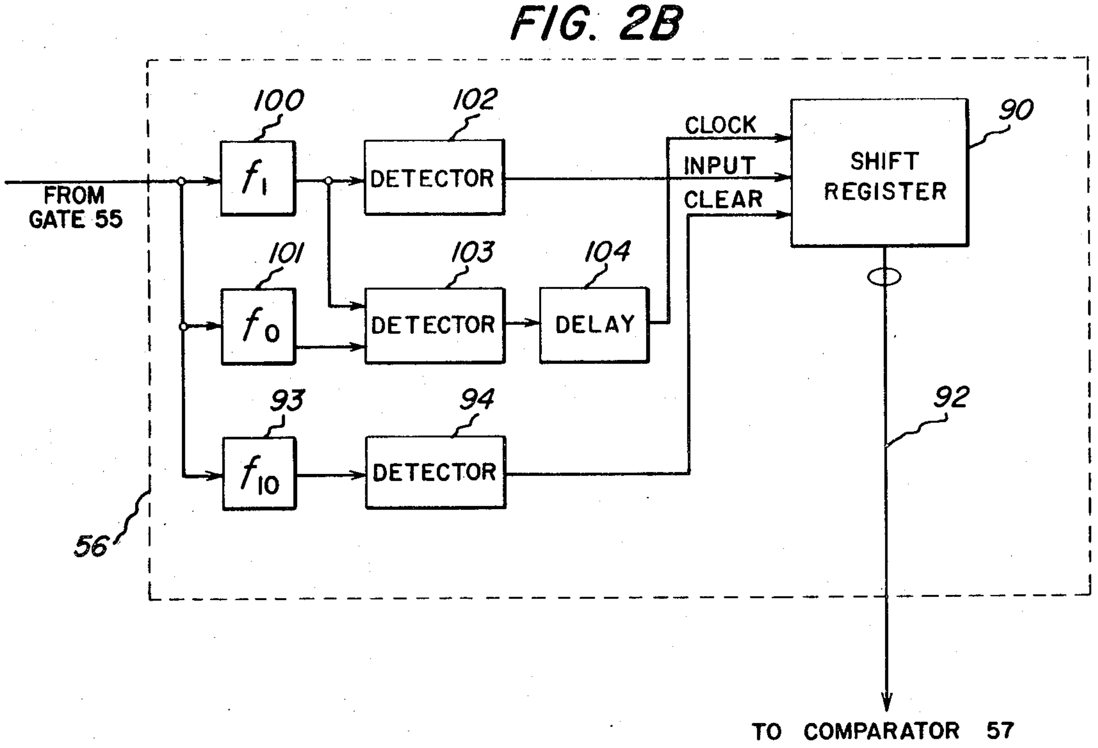

Output signals from gate 55 are coupled to an audio-to-binary converter 56. This converter changes audio tones into binary coded signals. Thus, if the spiral groove identification information recorded in the master groove of disk 20 is in the form of simultaneously occurring tones, each tone representing a separate binary number, audio-to-binary converter 56 totals the numbers represented by each of the simultaneously occurring tones into a single binary number. This operation is performed by conventional apparatus, one type of which is illustrated in FIG. 2A and described infra. In the alternative, if the spiral groove identification information recorded in the master groove is in the form of sequentially occurring tones, wherein a tone of one frequency represents a binary ONE and a tone of another frequency represents a binary ZERO, then converter 56 may simply comprise a shift register receiving its input signals in serial fashion from gate 55 and furnishing an output signal to a comparator circuit 57. A circuit of this type is illustrated in FIG. 2B and described infra.

Each user has information selection apparatus 60 by which he may make his selection of audio information to be retrieved from storage. This apparatus may comprise a set of pushbuttons, or any other type of binary-encoding selection means. Alternatively, as previously pointed out, information selection apparatus 60 may be responsive to the tones produced by a selective tone generating telephone, so as to provide access to the stored data by means of tone generation after the telephone number of the data storage site has been dialed and the storage site is on the line. In this event, audio transducer 54 comprises a loudspeaker which may be cupped over the mouthpiece of the telephone at the data storage site in order to transmit back to the user at the selective tone generating telephone station, the data which he has selected.

Information selection apparatus 60 is connected to a plurality of flip-flops 65 in order to produce a desired number of signals corresponding to a binary representation of the data desired. This occurs whenever information selection apparatus 60 is operated. One type of information selection apparatus, which may be employed in the instant invention, is described and claimed in D. J. BenDaniel et al., application Ser. No. 827,068, now U.S. Pat. No. 3,605,285, filed concurrently herewith and assigned to the instant assignee.

When flip-flops 65 are set according to a binary representation of the portion of information selection apparatus 60 which has been actuated by the user, a binary-encoded signal is furnished to comparator 57. In addition, an INHIBIT-gate 66 coupling the stable output of a monostable or ONE-shot multivibrator 58 to solenoid 40 is switched into its blocked or nonconductive condition at the same time information selection apparatus 60 is actuated. This interrupts the flow of DC current which had previously been maintaining a reverse-directed magnetic field emanating from solenoid 40. If desired, the outputs of flip-flops 65 may be conventionally strobed through a delay line (not shown) after apparatus 60 has been actuated to allow transient voltages to settle down before the flip-flop output signals are applied to comparator 57.

Those circuits of the plurality of flip-flop circuits 65 receiving a binary ONE, for example, are set and those circuits of the plurality of flip-flops receiving a binary ZERO are reset. In this fashion, the total binary number produced by information selection apparatus 60 is stored in flip-flops 65 and applied to comparator 57. The binary number remains stored in flip-flops 65, even though the information selection apparatus has been subsequently deenergized until the output signal from audio-to-binary converter 56 coincides with the output signal of flip-flops 65. At this juncture, monostable multivibrator 58 is switched into its unstable condition, actuating solenoid 40 with current flow in the opposite direction from that which had created the reverse-directed magnetic field and simultaneously resetting each of flip-flops 65.

In the circumstances wherein spiral groove identification information is recorded in the form of audio tones, output signals in the form of binary information are furnished from audio-to-binary converter 56 to comparator circuit 57 through a cable 92. When coincidence is detected by comparator 57, monostable vibrator 58 is driven into its unstable condition, causing a reversal of current flow through solenoid 40; that is, a forward-directed magnetic field now emanates from the solenoid deflecting permanent magnet 35, and hence pickup arm 31, in the forward direction. However, immediately after the signal from comparator 57 ceases, monostable multivibrator 58 restores itself to its normal condition. The signal from comparator 57 ceases immediately upon resetting of flip-flops 65 with the unstable output signal from monostable multivibrator 58. Restoration of the multivibrator 58 to its normal condition, when selection apparatus 60 is not actuated so that INHIBIT-gate 66 is conductive, again causes a reversal of current flow in solenoid 40, and the magnetic field of the solenoid again tends to exert an attractive force on permanent magnet 35.

By coupling the output of monostable multivibrator 58, when in its normal condition, through INHIBIT-gate 66 to solenoid 40, solenoid 40 maintains its reverse-directed field which holds the pickup arm tightly and, at the same time, keeps the pickup arm at a sufficient height above the phonograph disk to prevent the stylus from touching the disk. When gate 66 is inhibited by an output signal arising as a result of actuation of information selection apparatus 60, solenoid 40 deenergizes and releases the pickup arm. The pickup arm thus drops, allowing its stylus to contact the phonograph disk in a region between the master groove and the disk perimeter and the lead-in groove then moves the stylus into the master groove.

During this period, flip-flop circuit 67 remains in its reset condition, maintaining gate 53 in its blocked or nonconductive condition and gate 55 in a conductive condition. This maintains audio transducer 54 muted and audio-to-binary converter 56 receptive to audio signals picked up from the master groove.

When monostable multivibrator 58 switches to its unstable condition as a result of comparator 57 having detected coincidence between the data recorded in the master groove of the phonograph disk and the data represented by actuated information selection apparatus 60, flip-flops 65 are reset, flip-flop 67 is set, and audio-to-binary converter 56 ceases operation. This removes all data supplied to comparator 57. Monostable multivibrator 58 then switches back to its normal or stable condition. If, at this time, information selection apparatus 60 is not actuated, gate 66 is conductive and a reverse magnetic field is once again produced by solenoid 40. However, due to the separation between solenoid 40 and the pickup arm at this time, the reverse magnetic field of the solenoid is of insufficient strength to attract the pickup arm.

Because flip-flop circuit 67 is now in its set condition, designated S, gate 53 is rendered conductive and gate 55 is rendered nonconductive. The effect of flip-flop circuit 67 having switched to its set condition is thus to allow transducer 54 to reproduce audio information picked up by the stylus of the pickup arm and, at the same time, to prevent false actuation of converter 56 by the recorded audio information.

At the end of each information groove recorded on the disk, the reset switch 68 of the phonograph is closed, This switch, which actuates the phonograph pickup arm to return to its reset or standby position, is also coupled to the reset side of flip-flop circuit 67. The effect of the signal produced by reset switch 68 is thus to return flip-flop circuit 67 to its reset condition, thereby again inhibiting gate 53 and returning gate 55 to its conductive condition.

FIG. 2A is a schematic illustration apparatus which may be employed in audio-to-binary converter 56 shown in FIG. 2. The apparatus comprises a plurality of different narrow band-pass filters 69–79, with their band-pass frequencies designated $f_0$-$f_{10}$, respectively. Each of filters 60 and 79 is coupled through an envelope detector 80–90, respectively, to the signal input of gates 120–130, respectively, so that only a DC pulse can be applied to the signal inputs of the gates. The signals furnished to gates 120–130 are passed therethrough by a control signal occurring in response to any of the tone signals supplied to converter 56 and gate 55 of FIG. 2. The control signal is furnished from a differentiator circuit 94 in response to the output signal of a delay circuit 93 driven by an envelope detector 91, Envelope detector 91 is driven by the output signal of gate 55 of FIG. 2. By delaying this signal supplied by differentiator 94, sufficient time is allowed for transients at the outputs of detectors 80–90 to die out prior to furnishing the output signals of these detectors, in parallel to comparator 57 through cable 92. False spiral groove identification data are thus avoided.

In operation, the concurrent audio tones which identify these spiral grooves are produced from phonograph pickup 31, shown in FIG. 2, whenever the stylus of the pickup rides in the master groove of the phonograph disk. Each tone represents a predetermined binary numeral. Thus, assuming of up to 10 different identification tones are employed, detection of one or more of these tones results in application of the binary number represented by these tones, after a delay due to delay circuit 93, through cable 92 to comparator 57 of FIG. 2.

Application of this number to comparator 57 is only momentary, however, since it occurs only during the rise time of the output pulse produced by delay circuit 93 as determined by differentiator circuit 94. Similarly, the next-occuring tones representative of another spiral groove similarly produce a group of concurrent pulses which are applied to comparator 57, and so on. No intervening signals are required to clear the converter in preparation for its acceptance of the next group of concurrent audio tones.

FIG. 2B illustrates another form of audio-to-binary converter 56 which may be employed in the system of FIG. 2.

However, his converter is employed where the spiral groove identification data recorded in the master groove of the phonograph disk are in sequentially occurring binary form, with the first-occurring digit identifying each spiral groove being a binary ONE so as to comprise an identification bit. For this circuit, a binary ONE filter 100 and a binary ZERO filter 101 are employed in order to detect a frequency designated $f_1$, indicative of a ONE, and the frequency designated $f_0$, indicative of a ZERO. Filters 100 and 101 are now band-pass filters.

Filter 100 drives an envelope detector 102 and an envelope detector 103. Filter 101 drives envelope detector 103 only. Envelope detector 102 is connected to the input of a shift register 90 so as to provide an input pulse to the shift register whenever a binary ONE has been detected. Detector 103 is coupled to the clock input of shift register 90 through a delay circuit 104 which introduces a sufficient phase delay so that the output from detector 103 may advance the data stored in the individual stages of shift register 90 by a single stage, upon detection of either a binary ONE or binary ZERO signal. The output of shift register 90 is coupled, in parallel, to the input of comparator 57 through cable 92. Shift register 90 is cleared by a clear signal detected by a band-pass filter 95, designated $f_{10}$, which is coupled through an envelope detector 96 to the clear input of shift register 90. In this manner, binary information recorded on the master groove is stored in shift register 90 and supplied to comparator 57 each time an entire new digital word of binary information on the master groove of the phonograph disk has been sensed. By virtue of the aforementioned identification bit, output signals are withheld by shift register 90 until the identification bit arrives at the farthermost stage of shift register 90, thereby preventing application of false identification signals to comparator 57.

Figure 3:
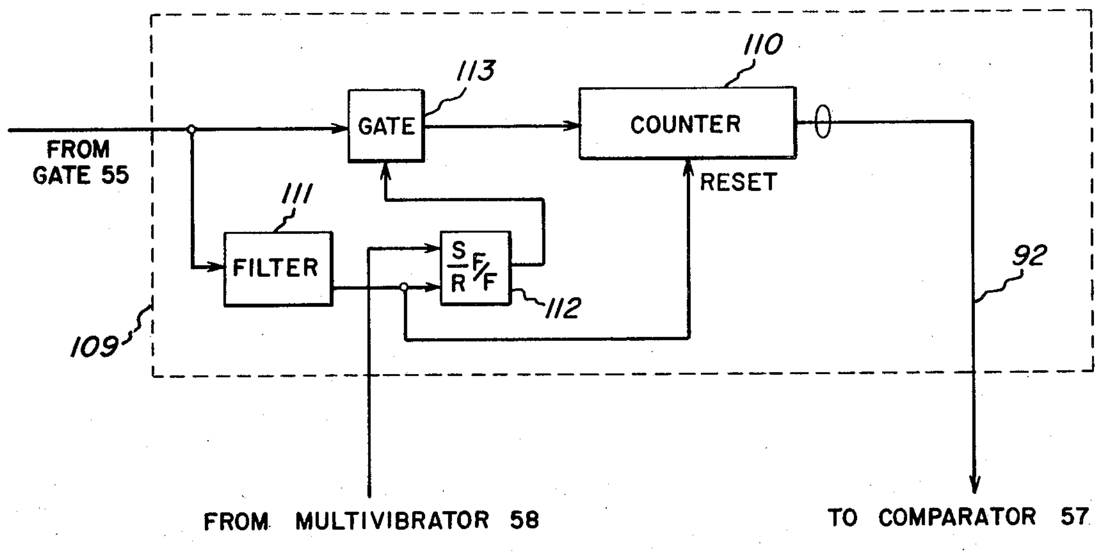
FIG. 3 is a block diagram of counter circuitry which may be utilized instead of the audio-to-binary converter of the apparatus shown in FIG. 2.

FIG. 3 illustrates counter circuitry 109 which may be substituted for audio-to-binary converter 56 of FIG. 2 whenever the spiral groove identification information recorded in the master groove of a phonograph disc is in the form of audio pulses to be counted. Thus, each of the audio pulses is furnished to the input of a pulse counter 110 which produces a binary output signal, in parallel fashion, over cable 92. The audio pulses furnished to the input of counter 110 are preferably of a single frequency. In addition, a reset signal of a different frequency is recorded in the master groove. This signal is detected by a narrow band-pass filter 111, the output of which resets counter 110 to zero. This reset pulse is recorded in but a single location in the entire master groove and serves as an indexing mark for counter 110 to begin counting. In addition, filter 111 resets a flip-flop circuit 112 which thereupon switches a gate 113 into its conductive condition. Gate 113 couples gate 55 of FIG. 2 to the input of counter 110, permitting the counter to begin its count from zero, since the counter is simultaneously reset to zero by the output signal from filter 111.

When counter 110 has counted to a number which coincides with the number furnished to the output of comparator circuit 57 from flip-flops 65, monostable multivibrator 58 switches into its unstable condition. The output of monostable multivibrator 58, when in its unstable condition, is furnished to the set input, designated S, of flip-flop circuit 112. This returns flip-flop 112 to its set condition, rendering gate 113 nonconductive.

When flip-flop circuit 112 is next switched to the reset condition, gate 113 is again rendered conductive by the flip-flop circuit. At the same time, counter 110 is reset to zero by the output signal from filter 111 which resets the flip-flop circuit. The counter is then ready to begin counting the next time information selection apparatus 60 is actuated.

To recapitulate operation of the system of the invention, a phonograph disk containing the audio information to be retrieved is placed on the turntable of the phonograph. The turntable is started into continuous rotation. When a user desires information from the data stored on the rotating disk, he merely actuates the information selection apparatus which may be a pushbutton selection device, as described in the aforementioned BenDaniel et al. application, or, if the user is using a selective tone generating telephone, depresses the pushbuttons corresponding to the number which correlates to the date he desires. It should be noted that, for a large system, a large number of phonograph disks may be stored in a bank of disks (not shown), and upon actuation of a suitable data selection device, the disk containing the information desired is then actuated by mechanisms similar to that employed in present-day jukeboxes. This mechanism then places the desired disk on the turntable and sets the turntable into rotation.

The sequence of operations which next takes place can be best described with reference to both the FIGS. 1 and 2, and operation of pickup arm 31 and solenoid 40 only, will be described. Selection apparatus 60 establishes a binary number at the output of flip-flops 65, which is then furnished to comparator 57. At the same time, actuation of information selection apparatus 60 inhibits gate 66, so that solenoid 40, which previously was in the reverse field generating condition, is deenergized. Pickup arm 31 then drips away from solenoid 40, permitting its stylus 44 to be guided by lead-in groove 24 to master groove 23 of disk 20. The pickup arm thereupon encounters recorded spiral information groove identification signals, and furnishes these signals through audio output circuitry 52 and gate 55, which is in the conductive condition to audio-to-binary converter 56.

As the phonograph disk rotates, the output number supplied by converter 56 through cable 92 to comparator 57 continues to change. When comparator 57 detects coincidence, monostable multivibrator 58 is triggered into its unstable condition, causing solenoid 40 to produce a forward-directed magnetic field. This causes pickup on 31 to be pushed essentially toward the center of disk 20, so that upon encountering the next-occurring information groove, the stylus enters the groove to enable reproduction of the audio information recorded thereon. Stereo recording can be used so that each spiral information groove contains two data messages. At the same time flip-flops 65 are reset, the flip-flop circuit 67 is switched to its set condition. This causes comparator 57 to return to a no-signal output condition, permitting monostable multivibrator 58 to return to its stable output condition. Because information selection apparatus is by now deenergized, gate 66 is not longer inhibited, and solenoid 40 is again returned to its reverse field generating condition. However, because the pickup arm 31 and its associated permanent magnet 35 have moved away from solenoid 40, the solenoid has no influence on the pickup arm at this time.

With flip-flop circuit 67 switched to its set condition, gate 53 is no longer inhibited and gate 55 is switched to its nonconductive condition. Thus, audio-to-binary converter 56 can no longer receive cells from gate 55, and returns to a reset condition as a result of operation such as described in conjunction with FIGS. 2A and 2B, or FIG. 3. Audio transducer 54 thus reproduces the audio information recorded on the information groove 22 in which stylus 44 is travelling, permitting the user to listen to the audio information which he has selected.

At the end of the information recorded on the selected one of information grooves 22, the phonograph mechanism returns pickup arm 31 to its standby or reset position, closing switch 68 so as to reset flip-flop circuit 67, This again inhibits gate 53, halting audio output signals from audio transducer 54. At the same time, gate 55 is gain rendered conductive, permitting signals from audio output circuitry 53 to actuate audio-tonbinary converter 56. Moreover, when the phonograph mechanism has returned pickup arm 31 to its reset or starting condition, permanent magnet 35 is attracted by the reverse field of solenoid 40, thus holding the pickup arm in the standby condition, ready for the next actuation of the information selection apparatus. In the event more then one selection device of apparatus 60 must be programmed to reproduce the same information, the programming may be accomplished in a different way depending on whether the audio-to-binary converter 56 of FIG. 2 is that shown in FIG. 2A or 2B, or if it is replaced with counter circuitry 109 of FIG. 3. This, in turn, depends on how the audio identification information recorded on master groove 23 just ahead of the intersection with the desired one of grooves 22 to be selected, and immediately following the preceding interception of a groove 22 with master groove 23, is recorded, With the circuitry of FIG. 2A, this identification information involves the recording of a sequence of several simultaneous audiofrequency tones, so that the tones represented by each actuation of the information selection apparatus 60 which are to produce duplicate information, are recorded in this portion of groove 23 and regardless of which one of the duplicate selections is made, the same one of grooves 22 is selected or accessed. With the circuitry of FIG. 2B, this identification information involves the recording of a sequence of several binary numbers in audiofrequency form, so that, again, regardless of which one of the duplicate selections is made, the same one of grooves is accessed. With the circuitry of FIG. 3, this identification information involves recording of a sequence of several pulses in audiofrequency form so that, as the stylus moves with respect to groove 23 in the region just ahead of the intersection with the desired one of grooves 22 to be selected, and immediately following the preceding interception of a groove 22 with master groove 23, counter 110 counts through a range which includes each of the selections which produce duplicate information. Again, therefore, regardless of which one of duplicate selections is made by actuations of the information selection apparatus, the same one of grooves 22 is selected.

The foregoing describes a system for producing a segment of audio information contained within audio information storage apparatus. The system permits random access to data in the form of recorded audio information in accordance with operation of selection means. In addition, audio data storage means capable of providing rapid retrieval of any desired portion of audio information recorded thereon are also described, as well as a phonograph disk having information recorded in grooves having the shape of nested spirals, with spiral groove identification information recorded in an annular groove near the parameter of the disk. A phonograph pickup arm utilized in conjunction with the aforementioned phonograph disk is capable of being moved by a magnetic field in a generally radial direction with respect to the turntable carrying the phonograph disk.

While the invention has been described in connection with a record in the form of a disk, it is apparent that other configurations of records, such as belts or cylinders, are also capable of carrying the type of information-bearing grooves utilized in accordance with the present invention and that such other records may be employed in accordance with the invention in its broader aspects. For example, in a cylindrical record, the annular groove containing the spiral groove identification data would be situated close to one end of the cylinder and the nested spirals would emanate therefrom in circumferentially spaced relation.

While only certain preferred features of the invention have been shown by way of illustration, many modifications and changes will occur to those skilled in the art. If is, therefore, to be understood that the appended claims are in tended to cover all such modifications and changes as fall within the true spirit and scope of the invention.

What we claim as new and desire to secure by Letters Patent of the United States is:

1. Apparatus for providing random access to any predetermined one of a plurality of stored audio messages and audio reproduction thereof, comprising:

a recording carrying a plurality of independent information-bearing grooves thereon, said grooves being formed in the shape of nested spirals each terminating in angularly spaced relation near the perimeter of the record;

an additional groove in the shape of an annulus containing recorded audio message identification data recorded thereon and situated between the perimeter of said record and said nested spiral-shaped grooves;

phonograph means carrying said record thereon and including a pickup arm having stylus means carried thereby;

first circuit means producing an electrical output representative of the audio message identification data when the stylus means of said pickup arm rides in said additional groove, second circuit means producing anyone of a plurality of electrical outputs for selecting the message recorded in a predetermined one of said information-bearing grooves;

third circuit means comparing said electrical outputs; and means responsive to said third circuit means for actuating said pickup arm to move the stylus means thereof into the selected information-bearing spiral groove as identified by the comparison of said electrical outputs.

2. Apparatus for providing random access to any predetermined one of a plurality of stored audio messages and audio reproductions thereof, comprising:

a record carrying a plurality of independent information-bearing grooves thereon, said grooves being formed in the shape of nested spirals;

an additional groove in the shape of an annulus containing recorded audio message identification data recorded thereon and situated close to the perimeter of said record, said additional groove intersecting each of the spiral-shaped grooves near the outer end thereof;

phonograph means carrying said record thereon and including a stylus-bearing pickup arm;

first circuit means producing an electrical output representative of the audio message identification data when the stylus of said pickup arm rides in said additional groove, second circuit means producing anyone of a plurality of electrical outputs for selecting the message recorded in a predetermined one of said information-bearing grooves;

third circuit means comparing said electrical outputs; and means responsive to said third circuit means for actuating said pickup arm to move the stylus thereof into the selected information-bearing spiral groove as identified by the comparison of said electrical outputs.

3. The apparatus of claim 5 wherein said means for actuating said pickup arm comprises a permanent magnet mounted on said pickup arm, and a solenoid coupled to said third circuit means for establishing a magnetic field to interact with said permanent magnet.

4. Apparatus for providing random access to any predetermined ones of a plurality of stored audio messages and audio reproduction thereof, comprising:

a record disk carrying a plurality of independent, information-bearing grooves thereon, said grooves being formed in the shape of nested spirals;

an additional groove in the shape of an annulus containing recorded audio message identification data recorded therein and situated close to the perimeter of said disk, said additional groove intersecting each of the spiral-shaped grooves;

phonograph means carrying said record disk thereon and including a plurality of stylus-bearing pickup arms;

a plurality of first circuit means each coupled respectively to one of said pickup arms and each producing an electrical output representative of the recorded message identification data when the stylus of said pickup arm rides in said additional groove;

a plurality of said second circuit means each producing anyone of a plurality of electrical outputs for selecting the information recorded in a predetermined one of said information-bearing grooves, and third circuit means comparing the electrical output of one of said first circuit means and a corresponding one of said second circuit means and means responsive to said third circuit means for actuating the corresponding pickup arm to move the stylus thereof to the selected spiral groove as indicated by the comparison of the electrical outputs of the corresponding first and second circuit means.

5. The apparatus of claim 7 wherein said means for actuating each of said pickup arms, respectively, comprises a permanent magnet mounted on each of said pickup arms, and a plurality of solenoids coupled respectively to one of said third circuit means, respectively, each of said solenoids establishing a magnetic field to interact with the permanent magnet mounted on one of said pickup arms, respectively.

* * * * *